United States Patent
Laaksonen et al.

(10) Patent No.: US 8,787,575 B2
(45) Date of Patent: Jul. 22, 2014

(54) METHOD AND APPARATUS FOR PROPAGATING ENCRYPTION KEYS BETWEEN WIRELESS COMMUNICATION DEVICES

(75) Inventors: Miika Laaksonen, Espoo (FI); Hannu Ensio Laine, Espoo (FI); Jan-Erik Ekberg, Vantaa (FI)

(73) Assignee: France Brevets, Paris (FR)

( * ) Notice: Subject to any disclaimer, the term of this patent is extended or adjusted under 35 U.S.C. 154(b) by 604 days.

(21) Appl. No.: 12/675,784

(22) PCT Filed: Aug. 31, 2007

(86) PCT No.: PCT/IB2007/053521
§ 371 (c)(1),
(2), (4) Date: Jul. 22, 2010

(87) PCT Pub. No.: WO2009/027770
PCT Pub. Date: Mar. 5, 2009

(65) Prior Publication Data
US 2010/0303236 A1    Dec. 2, 2010

(51) Int. Cl.
*H04W 12/02* (2009.01)
*H04W 12/04* (2009.01)

(52) U.S. Cl.
CPC .................................. *H04W 12/04* (2013.01)
USPC .............................................. 380/270; 726/4

(58) Field of Classification Search
CPC .................................................... H04W 12/04
USPC .............................................. 380/270; 726/4
See application file for complete search history.

(56) References Cited

U.S. PATENT DOCUMENTS

| 7,181,614 | B1 | 2/2007 | Gehrmann et al. |
| 2004/0054899 | A1 | 3/2004 | Balfanz et al. |
| 2005/0100166 | A1 | 5/2005 | Smetters et al. |
| 2005/0266798 | A1* | 12/2005 | Moloney et al. ............ 455/41.2 |
| 2005/0289347 | A1* | 12/2005 | Ovadia ........................ 713/171 |
| 2006/0052141 | A1* | 3/2006 | Suzuki ...................... 455/569.1 |
| 2006/0077034 | A1* | 4/2006 | Hillier ........................ 340/5.61 |
| 2006/0105712 | A1* | 5/2006 | Glass et al. ................. 455/41.2 |

(Continued)

FOREIGN PATENT DOCUMENTS

| EP | 1496660 | 1/2005 |
| WO | WO0247348 | 6/2002 |
| WO | WO03056746 | 7/2003 |

OTHER PUBLICATIONS

Communication with Supplementary European Search Report of European App. No. EP 07 82 6225—Date of Completion of Search: Dec. 19, 2011, 9 pages.

(Continued)

*Primary Examiner* — Techane Gergiso
(74) *Attorney, Agent, or Firm* — Locke Lord LLP

(57) ABSTRACT

A system for propagating encryption key information between wireless communication devices without the requirement of pairing each and every device. A wireless communication device may be paired with at least one device in a group of devices. When a secure link is established between these devices, a determination may be made as to whether encryption key information should be passed from one device to another. The additional encryption key information may allow a wireless communication device to create a secure link with other devices without having to first establish a trusted relationship (e.g., go through a pairing process) with the other devices.

24 Claims, 14 Drawing Sheets

(56) References Cited

U.S. PATENT DOCUMENTS

| | | |
|---|---|---|
| 2006/0135065 A1* | 6/2006 | Lee et al. ................. 455/41.1 |
| 2006/0153384 A1* | 7/2006 | Bhesania et al. ............. 380/270 |
| 2006/0230279 A1* | 10/2006 | Morris ..................... 713/182 |
| 2007/0050622 A1* | 3/2007 | Rager et al. ............... 713/168 |
| 2007/0052525 A1* | 3/2007 | Quan et al. ................ 340/10.4 |
| 2007/0055877 A1* | 3/2007 | Persson et al. ............. 713/171 |
| 2007/0069851 A1* | 3/2007 | Sung et al. ................ 340/5.1 |
| 2007/0069852 A1* | 3/2007 | Mo et al. .................. 340/5.1 |
| 2007/0120651 A1* | 5/2007 | Kobayashi et al. .......... 340/10.51 |
| 2007/0186105 A1* | 8/2007 | Bailey et al. .............. 713/168 |
| 2007/0234215 A1* | 10/2007 | Graham et al. ............. 715/723 |
| 2008/0125107 A1* | 5/2008 | Zechlin et al. ............. 455/422.1 |
| 2008/0170695 A1* | 7/2008 | Adler et al. ............... 380/277 |
| 2008/0175211 A1* | 7/2008 | Hansen et al. .............. 370/338 |
| 2008/0175390 A1* | 7/2008 | Alessio et al. ............. 380/278 |
| 2008/0280559 A1* | 11/2008 | Dandekar et al. ............ 455/41.2 |
| 2009/0052667 A1* | 2/2009 | Iwamura .................... 380/200 |
| 2009/0063851 A1* | 3/2009 | Nijdam ..................... 713/155 |

OTHER PUBLICATIONS

"International Search Report and the Written Opinion of the International Searching Authority", received in corresponding PCT Application No. PCT/IB2007/053521, Dated Jun. 5, 2008, 3 pages.

* cited by examiner

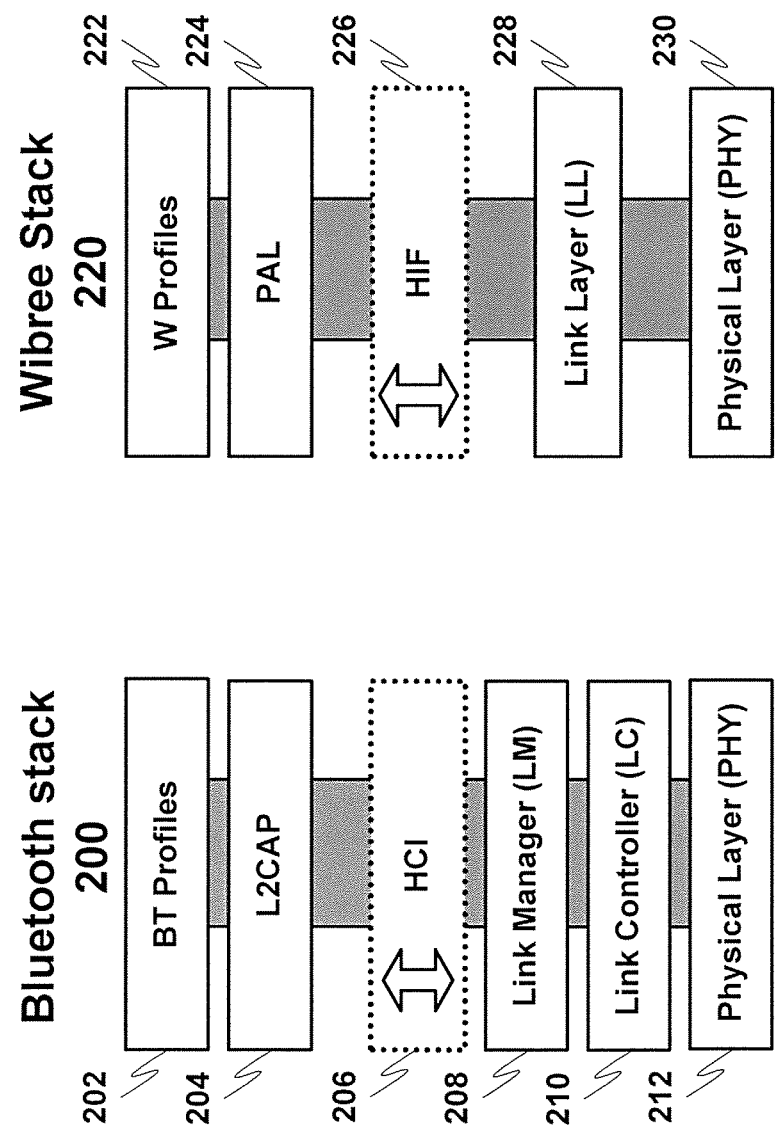

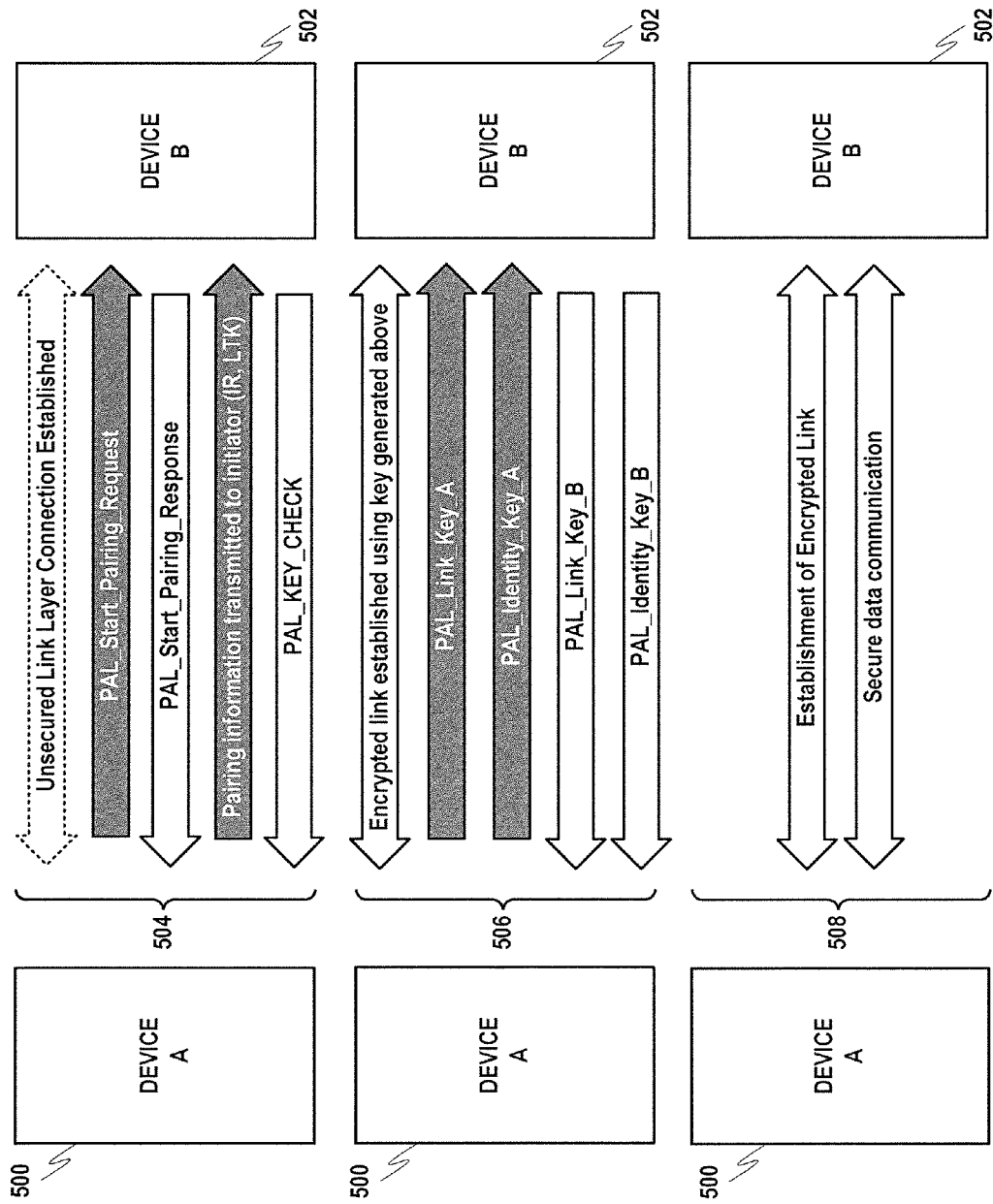

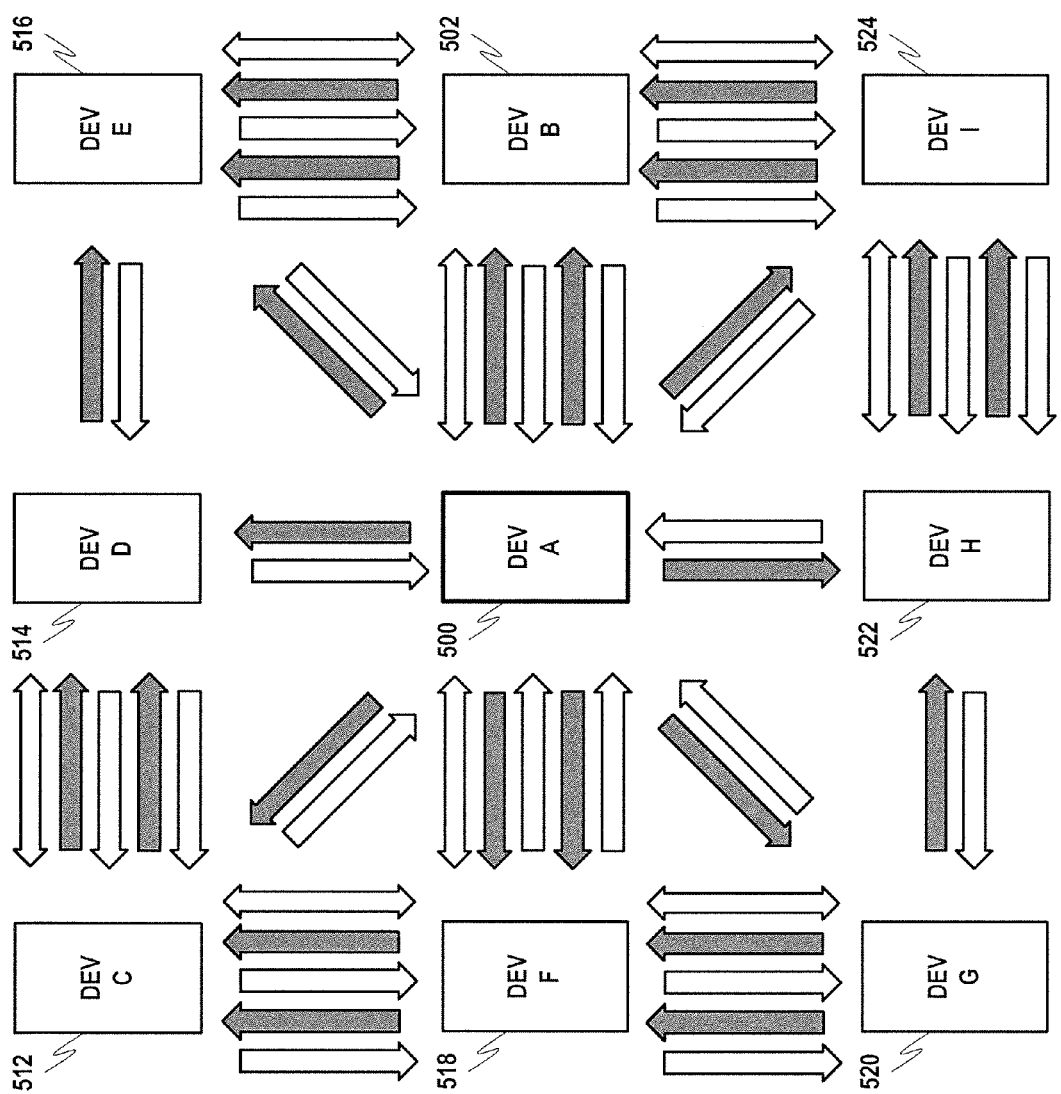

METHOD AND APPARATUS FOR PROPAGATING ENCRYPTION KEYS BETWEEN WIRELESS COMMUNICATION DEVICES

RELATED APPLICATION

This application was originally filed as PCT Application No. PCT/IB2007/053521 filed Aug. 31, 2007.

BACKGROUND OF INVENTION

1. Field of Invention

The present invention relates to secure communication for a wireless protocol, and more specifically, to the propagation of encryption information to devices communicating over a wireless protocol suitable for low complexity and/or power constrained wireless devices.

2. Background

The ability to communicate wirelessly is emerging as a feature included in many devices where communication was previously not contemplated. This expansion may be due to technological development in the area of multifunction wireless communication devices (WCD). Consumers may now replace common standalone productivity devices like computers, laptops, facsimile machines, personal digital assistants, etc. with a single device capable of performing all of these functions. These multifunction devices may help people complete tasks during time that was previously wasted (commutes to and from work, school, back home, etc.)

A multifunction device empowered with the aforementioned beneficial features may also be limited by small size and power constraints. For example, operator interfaces installed in these devices are often small, and not conducive to high throughput typing. As a result, users may rely on peripheral input devices such as keyboards, mice, headsets, etc. Since many of these peripheral devices are also wirelessly coupled, a WCD must not only support wireless communication with at least one peripheral device, it must also be able to support multiple simultaneous wireless connections to peripheral devices being operated concurrently.

These peripheral devices may now also include "intelligent" mechanisms enabled for wireless communication. For example, it may be desirable to wirelessly link two or more low-power devices in a beneficial relationship, such as linking a wristwatch including health-monitoring intelligence to various wireless sensors placed proximate to a user's body. Simpler communication protocols with lower power requirements are now being developed so that even devices that have not historically been able to communication wirelessly may now provide information to, and in some cases receive wireless information from, a WCD. These devices often run on battery power, and as a result, must rely on simple, power efficient communications in order to be functional. Many existing wireless communication protocols are either too simple or too complex to support these devices. For example, radio frequency (RF) communication is efficient and may receive power from a scanning device, however, currently available RF transponder chips are space-limited and usually only provide previously stored information. In the case of IEEE 802.11x WLAN (or "WiFi"), the substantial power requirements may not make it appropriate for small device installations. Even Bluetooth™, a standard that was originally designed to replace wires with a wireless medium for simple peripheral input devices, may not be the best solution for new devices with very limited power, interface and processing abilities.

Further, the limitations of these exemplary wireless protocols, when being applied to low complexity and/or power constrained wireless devices, becomes especially evident when trying to establish a link security strategy. Current security theories may often be too complex for simple devices in terms of required processing power and interface availability. These devices, such as remote wireless sensors, often have minimal onboard processing capabilities limited to information collection and transmission, limited overhead available for additional hardware integrated security solutions, and minimal user interface options provided for allowing a user, for example, to turn on a device and recognize it is operating through an LED, etc.

SUMMARY OF INVENTION

The present invention includes at least a method, device, chipset, computer program and system for propagating encryption keys amongst devices. The present invention, in at least one embodiment, decreases the requirement to establish secure or "trusted" relationships between every device in a group by propagating established key information for one or more devices by direct transfer from one device to another without having to pair each device.

In at least one embodiment of the present invention, encryption keys may be used in order to establish a secured link between one or more wireless communication devices. The information required to generate encryption keys may be transmitted from one device to another device during a process by which two devices become trusted to each other (e.g., pairing). The establishment of a trusted relationship may require the initiation of an unsecured wireless link followed by a plurality of wireless information exchanges. This process may prove detrimental to some devices, such as the constrained resource devices described above. The requirement of repeatedly pairing devices requires power and processing resources that may impact operations for these devices, especially if the process must be repeated for every encountered device with which information may be transacted. Also, the pairing process will necessarily create additional wireless traffic, which may impact efficiency. As a result, the present invention may employ a propagation strategy without the requirement of pairing every device, which conserves resources.

More specifically, once a trusted relationship has been established with at least one device within a group of devices, encryption keys to other devices in the same group of devices may be passed between these devices without the requirement of pairing to every other device. Eliminating the pairing requirement may beneficially reduce both resource consumption and communication traffic between the various active wireless communication devices. Further, in some embodiments of the present invention, determinations may be made as to whether a trusted device should receive some or all of the encryption keys stored in a device. This inquiry may evaluate identification information provided by a trusted device to determine whether the device is in a particular group of devices that are sharing their key information, whether the trusted device is currently operating in a certain mode that requires the keys of other devices, etc.

DESCRIPTION OF DRAWINGS

The invention will be further understood from the following detailed description of various exemplary embodiments, taken in conjunction with appended drawings, in which:

FIG. 2 discloses an exemplary Bluetooth™ protocol stack and an exemplary Wibree™ protocol stack usable with at least one embodiment of the present invention.

FIG. 5A discloses examples of a pairing process in accordance with at least one embodiment of the present invention.

FIG. 6D discloses an exemplary effect of the key propagation process in accordance with any or all of communication processes disclosed in FIG. 6A-6C.

DESCRIPTION OF EXEMPLARY EMBODIMENTS

While the invention has been described below in a multitude of exemplary embodiments, various changes can be made therein without departing from the spirit and scope of the invention, as described in the appended claims.

I. Wireless Communication Device

As previously described, the present invention may be implemented using a variety of wireless communication equipment. Therefore, it is important to understand the communication tools available to a user before exploring the present invention. For example, in the case of a cellular telephone or other handheld wireless devices, the integrated data handling capabilities of the device play an important role in facilitating transactions between the transmitting and receiving devices.

Figure 1A:
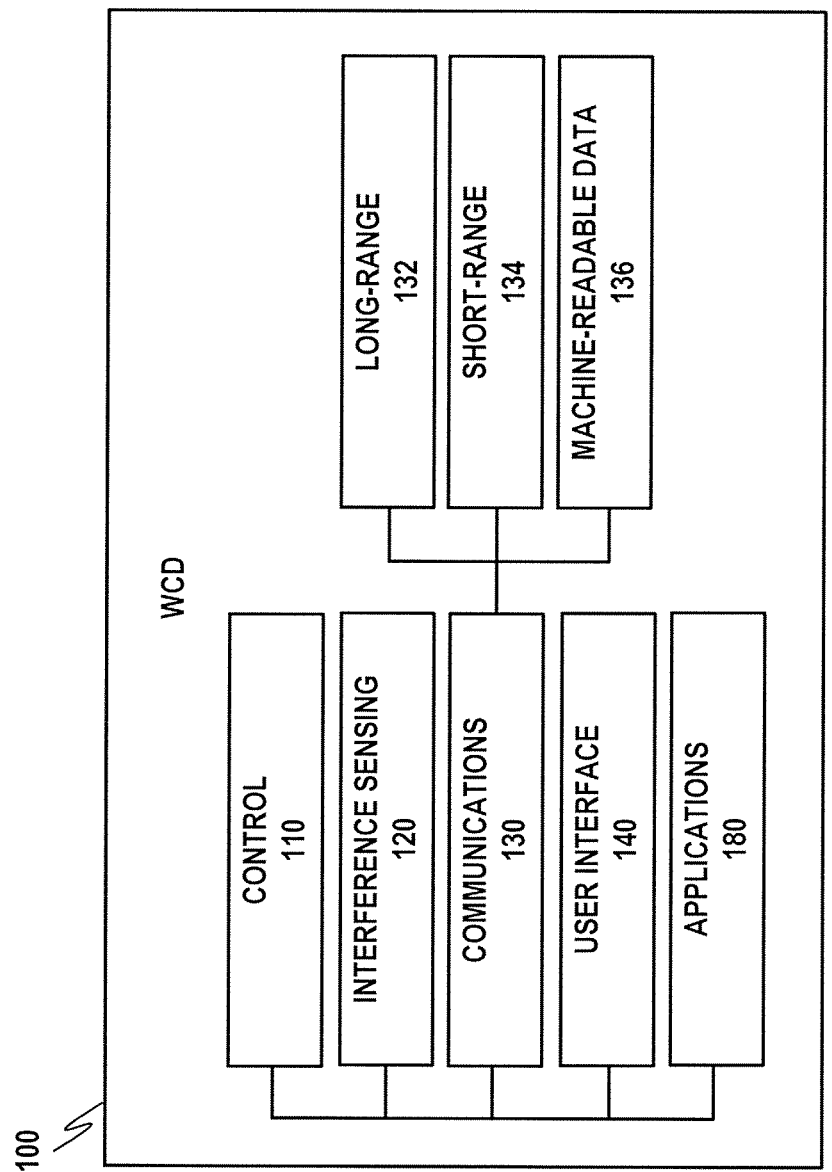
FIG. 1A discloses a modular description of an exemplary wireless communication device usable with at least one embodiment of the present invention.

FIG. 1A discloses an exemplary modular layout for a wireless communication device usable with the present invention. WCD 100 is broken down into modules representing the functional aspects of the device. These functions may be performed by the various combinations of software and/or hardware components discussed below.

Control module 110 regulates the operation of the device. Inputs may be received from various other modules included within WCD 100. For example, interference sensing module 120 may use various techniques known in the art to sense sources of environmental interference within the effective transmission range of the wireless communication device. Control module 110 interprets these data inputs, and in response, may issue control commands to the other modules in WCD 100.

Communications module 130 incorporates all of the communication aspects of WCD 100. As shown in FIG. 1A, communications module 130 may include, for example, long-range communications module 132, short-range communications module 134 and machine-readable data module 136 (e.g., for NFC). Communications module 130 utilizes at least these sub-modules to receive a multitude of different types of communication from both local and long distance sources, and to transmit data to recipient devices within the transmission range of WCD 100. Communications module 130 may be triggered by control module 110, or by control resources local to the module responding to sensed messages, environmental influences and/or other devices in proximity to WCD 100.

User interface module 140 includes visual, audible and tactile elements which allow a user to receive data from, and enter data into, the device. The data entered by a user may be interpreted by control module 110 to affect the behavior of WCD 100. User-inputted data may also be transmitted by communications module 130 to other devices within effective transmission range. Other devices in transmission range may also send information to WCD 100 via communications module 130, and control module 110 may cause this information to be transferred to user interface module 140 for presentment to the user.

Applications module 180 incorporates all other hardware and/or software applications on WCD 100. These applications may include sensors, interfaces, utilities, interpreters, data applications, etc., and may be invoked by control module 110 to read information provided by the various modules and in turn supply information to requesting modules in WCD 100.

Figure 1B:
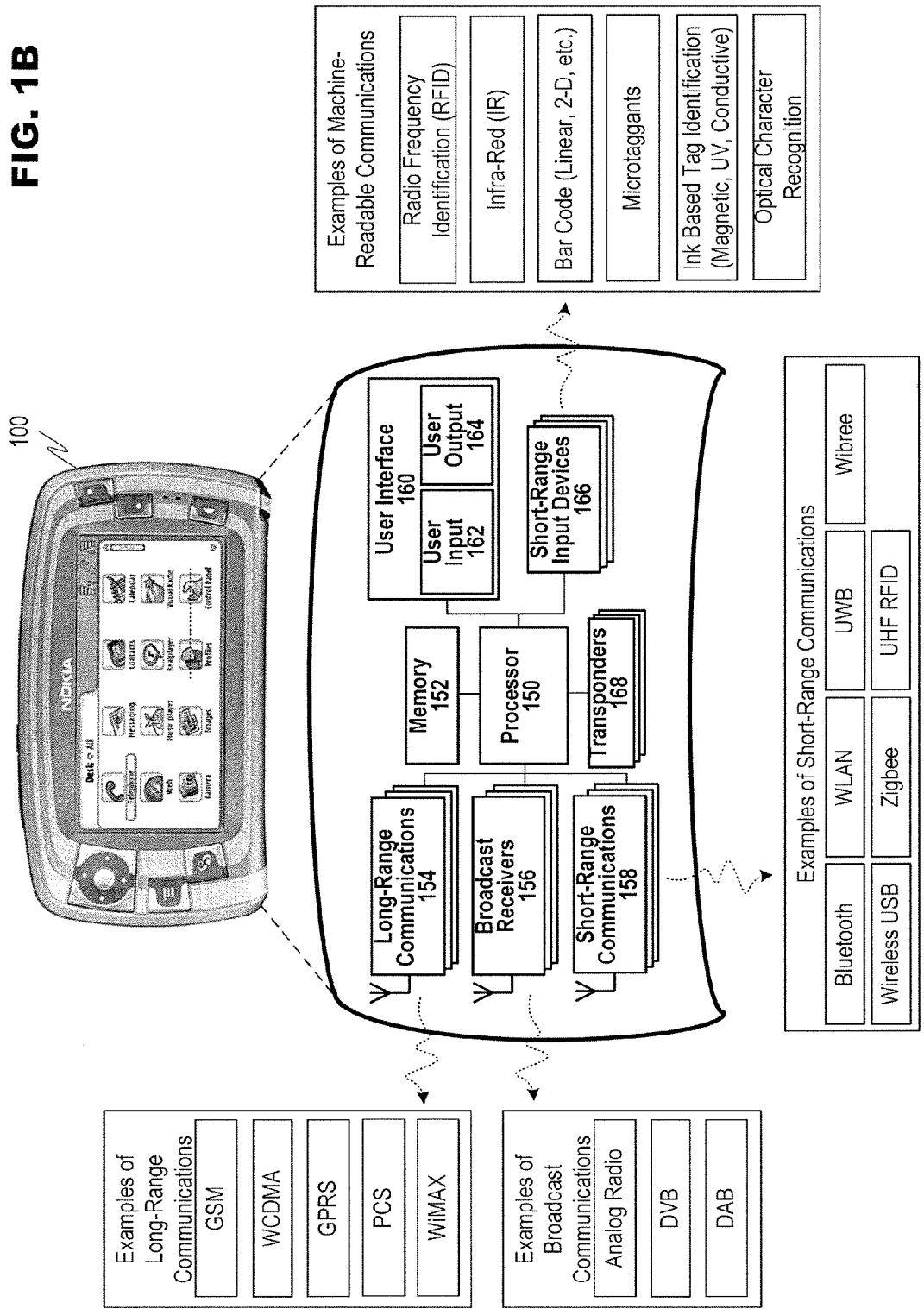
FIG. 1B discloses an exemplary structural description of the wireless communication device previously described in FIG. 1A.

FIG. 1B discloses an exemplary structural layout of WCD 100 according to an embodiment of the present invention that may be used to implement the functionality of the modular system previously described in FIG. 1A. Processor 150 controls overall device operation. As shown in FIG. 1B, processor 150 is coupled to at least communications sections 154, 158 and 166. Processor 150 may be implemented with one or more microprocessors that are each capable of executing software instructions stored in memory 152.

Memory 152 may include random access memory (RAM), read only memory (ROM), and/or flash memory, and stores information in the form of data and software components (also referred to herein as modules). The data stored by memory 152 may be associated with particular software components. In addition, this data may be associated with databases, such as a bookmark database or a business database for scheduling, email, etc.

The software components stored by memory 152 include instructions that can be executed by processor 150. Various types of software components may be stored in memory 152. For instance, memory 152 may store software components that control the operation of communication sections 154, 158 and 166. Memory 152 may also store software components including a firewall, a service guide manager, a bookmark database, user interface manager, and any communication utilities modules required to support WCD 100.

Long-range communications 154 performs functions related to the exchange of information over large geographic areas (such as cellular networks) via an antenna. These long-range network technologies have commonly been divided by generations, starting in the late 1970s to early 1980s with first generation (1G) analog cellular telephones that provided baseline voice communication, to modem digital cellular telephones. GSM is an example of a widely employed 2G digital cellular network communicating in the 900 MHZ/1.8 GHZ bands in Europe and at 850 MHz and 1.9 GHZ in the United States. In addition to basic voice communication (e.g., via GSM), long-range communications 154 may operate to establish data communication sessions, such as General Packet Radio Service (GPRS) sessions and/or Universal Mobile Telecommunications System (UMTS) sessions. Also, long-range communications 154 may operate to transmit and receive messages, such as short messaging service (SMS) messages and/or multimedia messaging service (MMS) messages.

As a subset of long-range communications 154, or alternatively operating as an independent module separately connected to processor 150, transmission receiver 156 allows WCD 100 to receive transmission messages via mediums such as Digital Video Broadcast for Handheld Devices (DVB-H). These transmissions may be encoded so that only certain designated receiving devices may access the transmission content, and may contain text, audio or video information. In at least one example, WCD 100 may receive these transmissions and use information contained within the transmission signal to determine if the device is permitted to view the received content.

Short-range communications 158 is responsible for functions involving the exchange of information across short-range wireless networks. As described above and depicted in FIG. 1B, examples of such short-range communications 158 are not limited to Bluetooth™, Wibree™, WLAN, UWB and Wireless USB connections. Accordingly, short-range communications 158 performs functions related to the establishment of short-range connections, as well as processing related to the transmission and reception of information via such connections.

Short-range input device 166, also depicted in FIG. 1B, may provide functionality related to the short-range scanning of machine-readable data (e.g., for NFC). For example, processor 150 may control short-range input device 166 to generate RF signals for activating an RFID transponder, and may in turn control the reception of signals from an RFID transponder. Other short-range scanning methods for reading machine-readable data that may be supported by short-range input device 166 are not limited to IR communication, linear and 2-D (e.g., quick response or QR) bar code readers (including processes related to interpreting universal product codes or UPC labels), and optical character recognition devices for reading magnetic, Ultraviolet (UV), conductive or other types of coded data that may be provided in a tag using suitable ink. In order for short-range input device 166 to scan the aforementioned types of machine-readable data, the input device may include optical detectors, magnetic detectors, CCDs or other sensors known in the art for interpreting machine-readable information.

As further shown in FIG. 1B, user interface 160 is also coupled to processor 150. User interface 160 facilitates the exchange of information with a user. FIG. 1B shows that user interface 160 includes a user input 162 and a user output 164. User input 162 may include one or more components that allow a user to input information. Examples of such components include keypads, touch screens, and microphones. User output 164 allows a user to receive information from the device. Thus, user output portion 164 may include various components, such as a display, light emitting diodes (LED), tactile emitters and one or more audio speakers. Exemplary displays include liquid crystal displays (LCDs), and other video displays.

WCD 100 may also include one or more transponders 168. This is essentially a passive device that may be programmed by processor 150 with information to be delivered in response to a scan from an outside source. For example, an RFID reader mounted in an entryway may continuously emit radio frequency waves. When a person with a device containing transponder 168 walks through the door, the transponder is energized and may respond with information identifying the device, the person, etc. In addition, a reader may be mounted (e.g., as discussed above with regard to examples of short-range input device 166) in WCD 100 so that it can read information from other transponders in the vicinity.

Hardware corresponding to communications sections 154, 156, 158 and 166 provide for the transmission and reception of signals. Accordingly, these portions may include components (e.g., electronics) that perform functions, such as modulation, demodulation, amplification, and filtering. These portions may be locally controlled, or controlled by processor 150 in accordance with software communication components stored in memory 152.

The elements shown in FIG. 1B may be constituted and coupled according to various techniques in order to produce the functionality described in FIG. 1A. One such technique involves coupling separate hardware components corresponding to processor 150, communications sections 154, 156 and 158, memory 152, short-range input device 166, user interface 160, transponder 168, etc. through one or more bus interfaces (which may be wired or wireless bus interfaces). Alternatively, any and/or all of the individual components may be replaced by an integrated circuit in the form of a programmable logic device, gate array, ASIC, multi-chip module, etc. programmed to replicate the functions of the stand-alone devices. In addition, each of these components is coupled to a power source, such as a removable and/or rechargeable battery (not shown).

The user interface 160 may interact with a communication utilities software component, also contained in memory 152, which provides for the establishment of service sessions using long-range communications 154 and/or short-range communications 158. The communication utilities component may include various routines that allow the reception of services from remote devices according to mediums such as the Wireless Application Medium (WAP), Hypertext Markup Language (HTML) variants like Compact HTML (CHTML), etc.

II. Wireless Communication Mediums

The present invention may be implemented with, but is not limited to, short-range wireless communication mediums. Bluetooth™ is an example of a short-range wireless technology quickly gaining acceptance in the marketplace. A Bluetooth™ enabled WCD may transmit and receives data, for example, at a rate of 720 Kbps within a range of 10 meters, and may transmit up to 100 meters with additional power boosting. Current systems may run at a nominal rate of 1 Mbps. A user does not actively instigate a Bluetooth™ network. Instead, a plurality of devices within operating range of each other will automatically form a network group called a "piconet". Any device may promote itself to the master of the piconet, allowing it to control data exchanges with up to seven "active" slaves and 255 "parked" slaves. Active slaves exchange data based on the clock timing of the master. Parked slaves monitor a beacon signal in order to stay synchronized with the master, and wait for an active slot to become available. These devices continually switch between various active communication and power saving modes in order to transmit data to other piconet members. In addition to Bluetooth™ other popular short-range wireless networks include WLAN (of which "Wi-Fi" local access points communicating in accordance with the IEEE 802.11 standard, is an example), WUSB, UWB, ZigBee (802.15.4, 802.15.4a), Wibree™ and UHF RFID. All of these wireless mediums have features and advantages that make them appropriate for various applications.

Wibree™ is an open standard industry initiative extending local connectivity to small devices with technology that increases the growth potential in these market segments. This emerging low-power communication standard has been recently embraced by the Bluetooth™ Special Interest Group, and as a result, the Wibree™ specification will soon become part of the Bluetooth™ specification as an ultra low power Bluetooth™ technology. With this integration, Wibree™ technology may complement close range communication with Bluetooth™-like performance in the 0-10 m range with a data rate of 1 Mbps. Wibree™ is optimized for applications requiring extremely low power consumption, small size and low cost. Wibree™ may be implemented either as stand-alone chip or as Bluetooth™-Wibree™ dual-mode chip. More information can be found on the Wibree™ website: www.wibree.com.

Now referring to FIG. 2, an exemplary Bluetooth™ protocol stack and an exemplary Wibree™ protocol stack are disclosed. Bluetooth™ stack 200 includes elements that may convey information from a system level to a physical layer where it may be transmitted wireless to another device. At the top level, BT Profiles 202 include at least a description of a known peripheral device which may be connected wirelessly to WCD 100, or an application that may utilize Bluetooth™ in order to engage in wireless communication with a peripheral device. The use of the phrase "peripheral devices" is not intended to limit the present invention, and is used only to represent any device external to WCD 100 also capable of wirelessly communicating with WCD 100. Bluetooth™ profiles of other devices may be established through a pairing procedure wherein identification and connection information for a peripheral device may be received by WCD 100 through a polling process and then saved in order to expedite the connection to the device at a later time. After the application and/or target peripheral device (or devices) is established, any information to be sent must be prepared for transmission. L2CAP level 204 includes at least a logical link controller and adaptation protocol. This protocol supports higher level protocol multiplexing packet segmentation and reassembly, and the conveying of quality of service information. The information prepared by L2CAP level 204 may then be passed to an application-optional host controller interface (HCI) 206. This layer may provide a command interface to the lower link manager protocol (LMP) layers, link manager (LM) 208 and link controller (LC) 210. LM 208 may establish the link setup, authentication, link configuration and other protocols related to establishing a wireless link between two or more devices. Further, LC 210 may manage active links between two or more devices by handling low-level baseband protocols. Wireless communication may then be established and conducted using the hardware (modem, antenna, etc.) making up physical layer (PHY) 212. Of course, the above identified layers of Bluetooth™ stack 200 may also be utilized in an order reversed from that disclosed above in order to receive a wireless transmission into WCD 100 from a peripheral device.

The layers in the standalone Wibree™ stack 220 are similar to the elements previously described. However, due to the relative simplicity of Wibree™ when compared to Bluetooth™, there are actually less layers utilized to achieve wireless communication. W Profiles 222, similar to the profiles used in Bluetooth™, are used to specify applications that may use Wibree™ for communication and peripheral devices with which a Wibree™ modem may wirelessly communicate. The profile adoption layer (PAL) 224 may be used to prepare the information for transmission via wireless communication. Host interface (HIF) layer 226 may provide an interface between the upper layers communicating with applications and schedulers in WCD 100, and the lower layers of the Wibree™ stack 220 which establish and maintain the links to peripheral devices. Lower layers of the Wibree™ stack 220 may further include at least link layer (LL) 228. LL 228 may both establish and maintain wireless communications with other wireless enabled devices through the use of Physical Layer (PHY) 230. Wibree™ LL 228, however, differs significantly from LM 208 and LC 210 in Bluetooth™.

III. Dual-Mode Modem

Figure 3A:
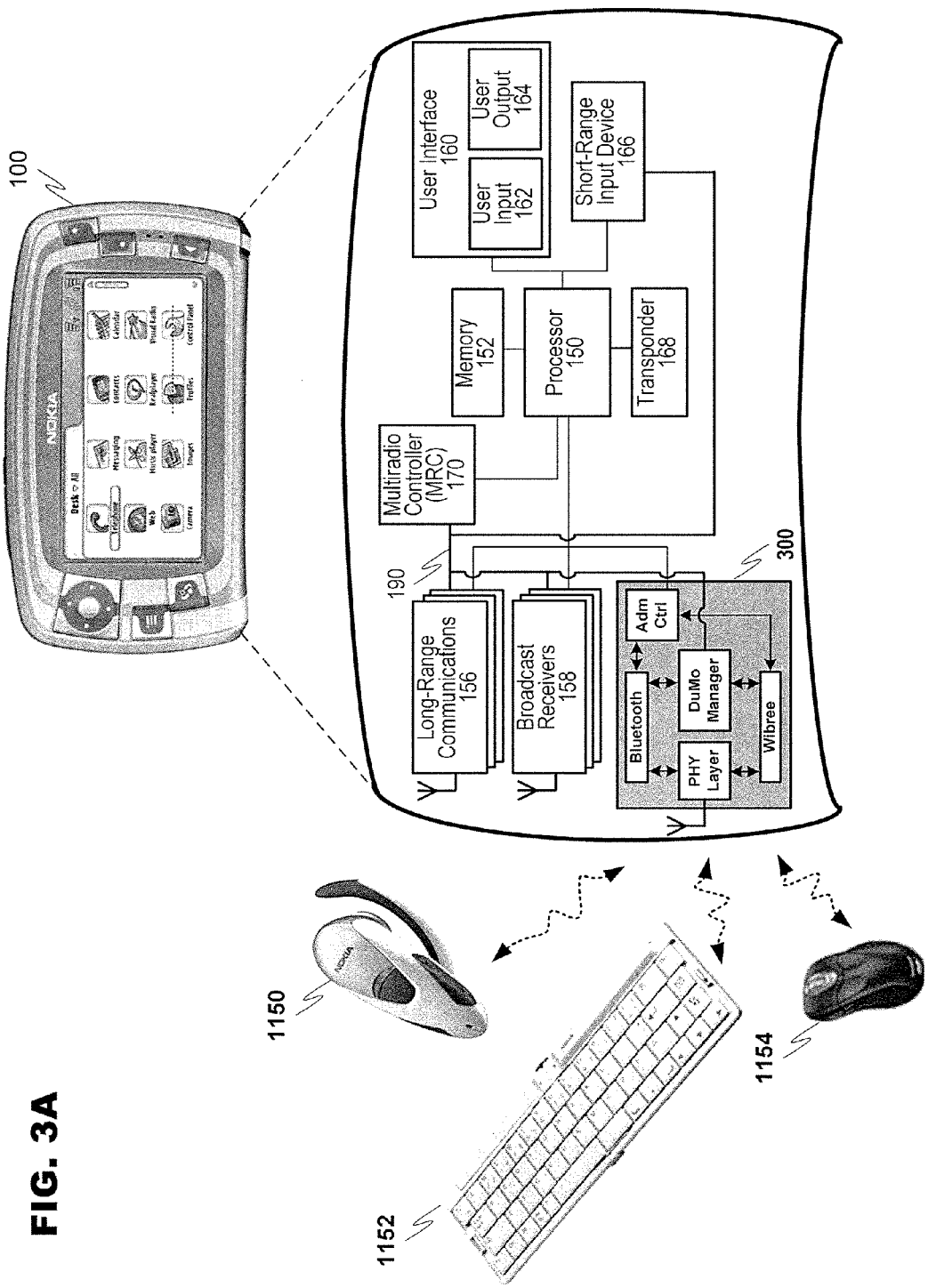
FIG. 3A discloses an example of multiple wireless peripheral devices attempting to communicate concurrently with a dual-mode radio modem in accordance with at least one embodiment of the present invention.

FIG. 3A includes an alternative exemplary implementation of at least one embodiment of the present invention. Again, in this example the three peripheral devices (1150, 1152 and 1154) are attempting concurrent communication with WCD 100 through dual-mode radio modem 300. Radio modem 300 may include local control resources for managing both "radios" (e.g., Bluetooth™ and Wibree™ software based radio control stacks) attempting to use the physical layer (PHY) resources of dual-mode radio modem 300. In this example, dual-mode radio modem 300 includes at least two radio stacks or radio protocols (labeled "Bluetooth" and "Wibree") that may share the PHY layer resources (e.g., hardware resources, antenna, etc.) of dual-mode radio modem 300. The local control resources may include an admission controller ("Adm Ctrl") and a dual-mode controller ("DuMo Manager"). These local control resources may be embodied as a software program and/or in a hardware form (e.g., logic device, gate array, MCM, ASIC, etc.) in a dual-mode radio modem interface, and the radio modem interface may be coupled to, or alternatively, embedded in dual-mode radio modem 300. The interaction of these control resources with the radio protocols utilizing dual-mode radio modem 300 is explained below.

Figure 3B:
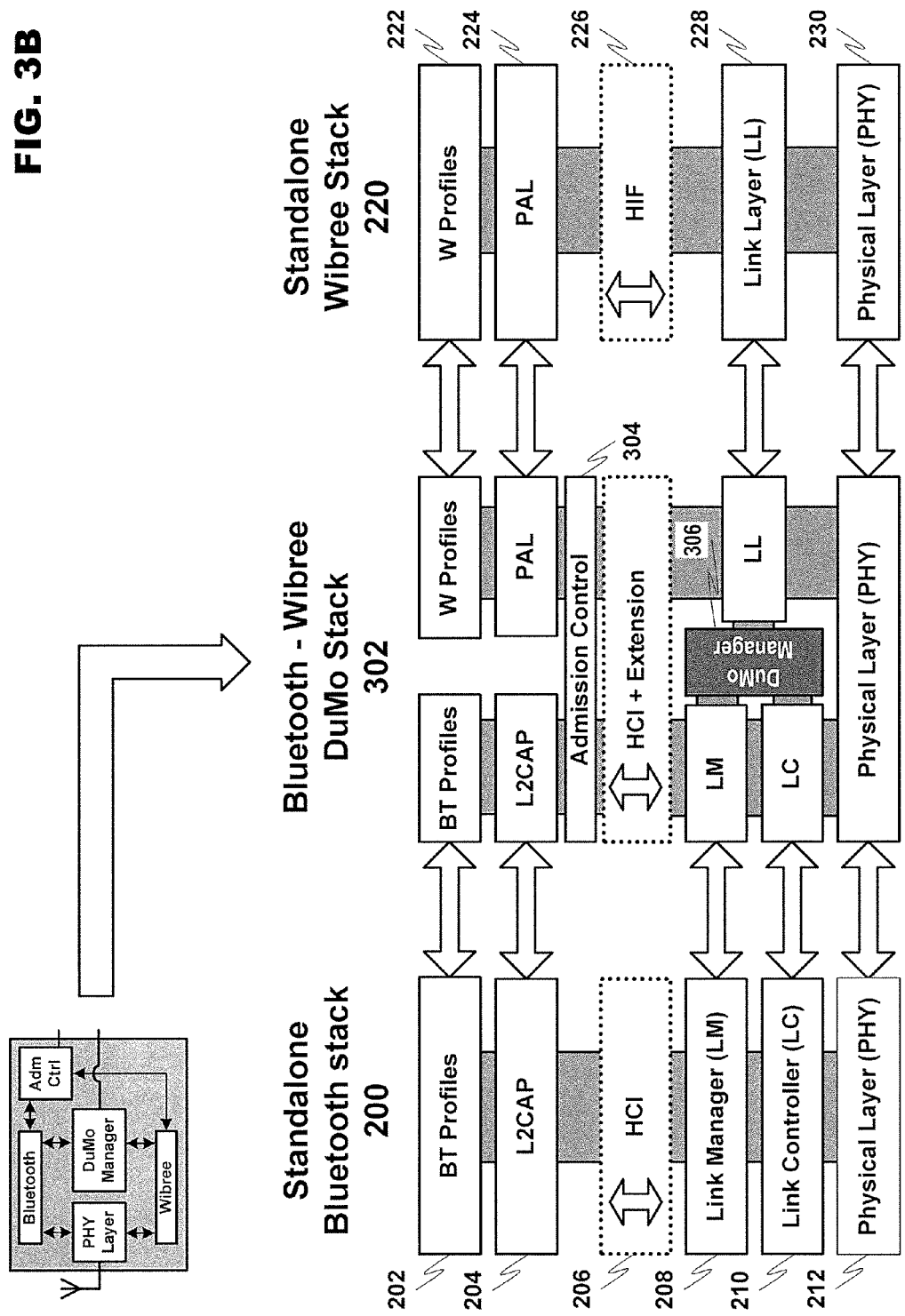
FIG. 3B discloses further detail pertaining to the example of FIG. 3A regarding operational enhancements for managing the operation of a dual-mode modem in accordance with at least one embodiment of the present invention.

With respect to FIG. 3B, an exemplary combination of the two separate radio protocol stacks (previously discussed with respect to FIG. 2) into a single combined entity controlled locally by at least an admission control 304 and a DuMo manager 306 is now disclosed. The two previously described standalone stacks are shown to establish the individual elements that may be incorporated into an integrated dual-mode entity 302. For a more specific discussion of the functioning of admission control 304 and a DuMo manager 306 in terms of managing the operations of dual-mode modem 300, please refer to application Ser. No. 11/538,310, filed Oct. 3, 2006, which is hereby incorporated by reference. Briefly, Admission control 304 may act as a gateway for the dual-mode radio modem 300 by filtering out both Bluetooth™ and Wibree™ requests from the operating system of WCD 100 that may result in conflicts. Scheduling information may also be provided by Multiradio controller (MRC) 170, wherein certain periods of operation are allocated to dual-mode radio modem 300 in view of the other active radio modems operating in WCD 100. This scheduling information may be passed down to both the HCI+Extension level of the combined protocol stacks and also to DuMo manager 306 for further processing. However, if scheduling information from MRC 170 is critical (delay-sensitive), it may be sent through MCS 190 via a direct connection to DuMo Manager 306. The information received by DuMo manager may 306 then be used to create an interleaved schedule for dual-mode radio modem 300 allowing both the Bluetooth™ and Wibree™ protocols to operate concurrently.

IV. Protocol Stacks and Packet Routing

Figure 4:
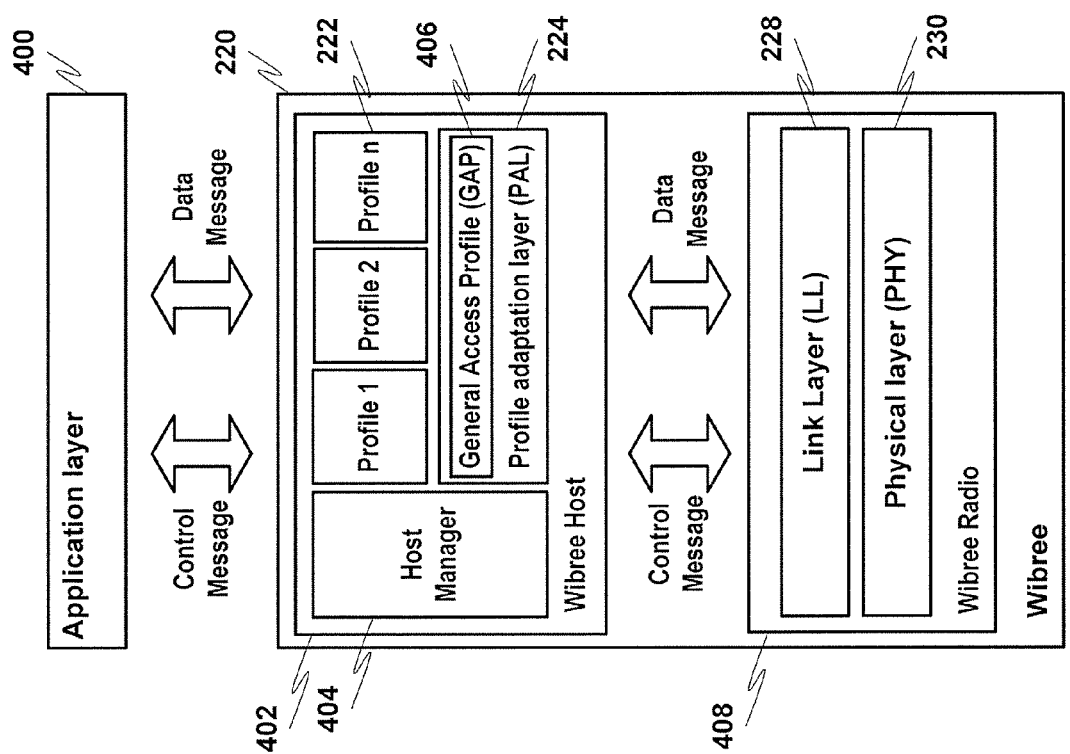
FIG. 4 discloses a more detailed example of a Wibree™ protocol stack in accordance with at least one embodiment of the present invention.

FIG. 4 includes a more detailed description of the upper layers of the Wibree™ communication protocol. The Wibree™ system includes two parts: the Wibree™ Radio 408 and the Wibree™ Host 402. Connection between radio 408 and host 402 goes through the HIF (Host Interface). Further, PAL 224 includes at least General Access Profile (GAP) 406.

Application layer 400 may include various programs that may be executed on a computing device. For example, an application may be a communication utility or productivity program running on a WCD. An application may use W Profiles 222 in Wibree™ (e.g. Profile 1, Profile 2, etc.) in order to send information into the Wibree™ protocol stack 220. This transaction may be supervised by Host Manager 404. The information may then be prepared by PAL 224 and GAP 406 for routing to Wibree™ radio 408, wherein LL 228 may both establish new wireless connections and manage existing connections with peripheral devices through the various resources (modem, antenna, etc.) that make up PHY layer 230.

V. Device Pairing and the Effect on Communication/Device Performance

The disclosure of the present invention will now begin to focus primarily on the use of the Wibree™ protocol for the sake of explanation. Wibree™ is an appropriate wireless communication medium for implementing the present invention for multiple reasons. Initially, Wibree™ has been designed for use in resource constrained wireless communication devices. Further, Wibree™, as will be described, uses an encryption key creation process that provides the flexibility to allow for passing established encryption keys from one device to another. Even in view of these advantages, the present invention is not only limited to being implemented using the Wibree™ protocol, and may use any similarly configured wireless communication medium.

Devices communicating via wireless communication mediums like Wibree™ may establish secure wireless links using encryption keys. In one scenario, these keys may be predetermined, for example during device manufacture. Predetermined encryption keys may, in some instances, be hard-coded into simple and/or low power devices not enabled with higher level processing. Alternatively, encryption keys may also be computed on the fly during initial device interaction. An example of encryption key establishment through initial device interaction is now disclosed in FIG. 5A, wherein an example of Wibree™ pairing and secure link establishment is disclosed. In this example, device A 500 does not have any sort of trusted relationship with device B 502. However, these devices may establish a relationship through a "pairing" process. This pairing process may include both a temporary session key establishment process as shown at 504 and a device pairing process as shown at 506. After the pairing process is complete, an encrypted link may be established to exchange data in a secure manner at 508.

As a initial process, a temporary session key may be established in accordance with the steps disclosed at 504. A device may "advertise" the desire to communicate with another device that responds as an "initiator" by establishing an unsecured link layer connection. The advertising device, in this example device A 500, may then send a request to start a pairing process, to which the initiator (e.g., device B 502) may respond. In the case of Wibree™, the advertising device may then transmit information to the initiator that will be employed in creating encryption keys usable for establishing a secured wireless link. This information may include an identity root (IR) and an encryption root, or long term key (LTK). The received IR and/or LTK information may then be utilized by the initiator device to compute a temporary session encryption key. This computed temporary session encryption key may be transmitted back to the advertising device to confirm accuracy. Upon successful completion, a temporary session encryption key usable in a subsequent device pairing process (process 506) is achieved.

The process of pairing and establishing a secure link between device A 500 and device B 502 is shown at 506 in FIG. 5A. The process simply involves the exchange of key information established, for example, during the previously described key process described at 504. In this example, device A 500 transmits a link key and identity key computed based on the IR and LTK information, and device B 502 reciprocates by sending the appropriate link and identity keys based on the same information. If the devices see the expected encryption keys from this exchange, then the devices become paired in a trusted relationship. Pairing devices, such as exemplary device A 500 and device B 502, allows these devices to establish a secure wireless link in an expedited manner. This expedited link establishment is shown at 508 in FIG. 5A. The two paired device (e.g., device A 500 and device B 502) may immediately establish a encrypted link over which data may be exchanged between the two devices in a secure manner.

It is important to note that wireless communication mediums such as Wibree™ may be more conducive to implementing various embodiments of the present invention over, for example, a wireless communication medium like Bluetooth™ due to the way in which Bluetooth™ encryption keys are formed. As previously described, Wibree™ encryption keys are configured based only on information provided by an advertising device. As a result, the encryption key may be passed from device to device because there is no device dependence when using this key. On the contrary, encryption keys computed in Bluetooth™ incorporate at least device-specific address information along with other random information from one or both of the paired devices. Therefore, a Bluetooth™ encryption key cannot be passed from one device to another because the device address information used to form the encryption key would not agree with the device address information of the offering device. This lack of continuity between encryption key and device may then result in a failure to establish a secure link.

Figure 5B:
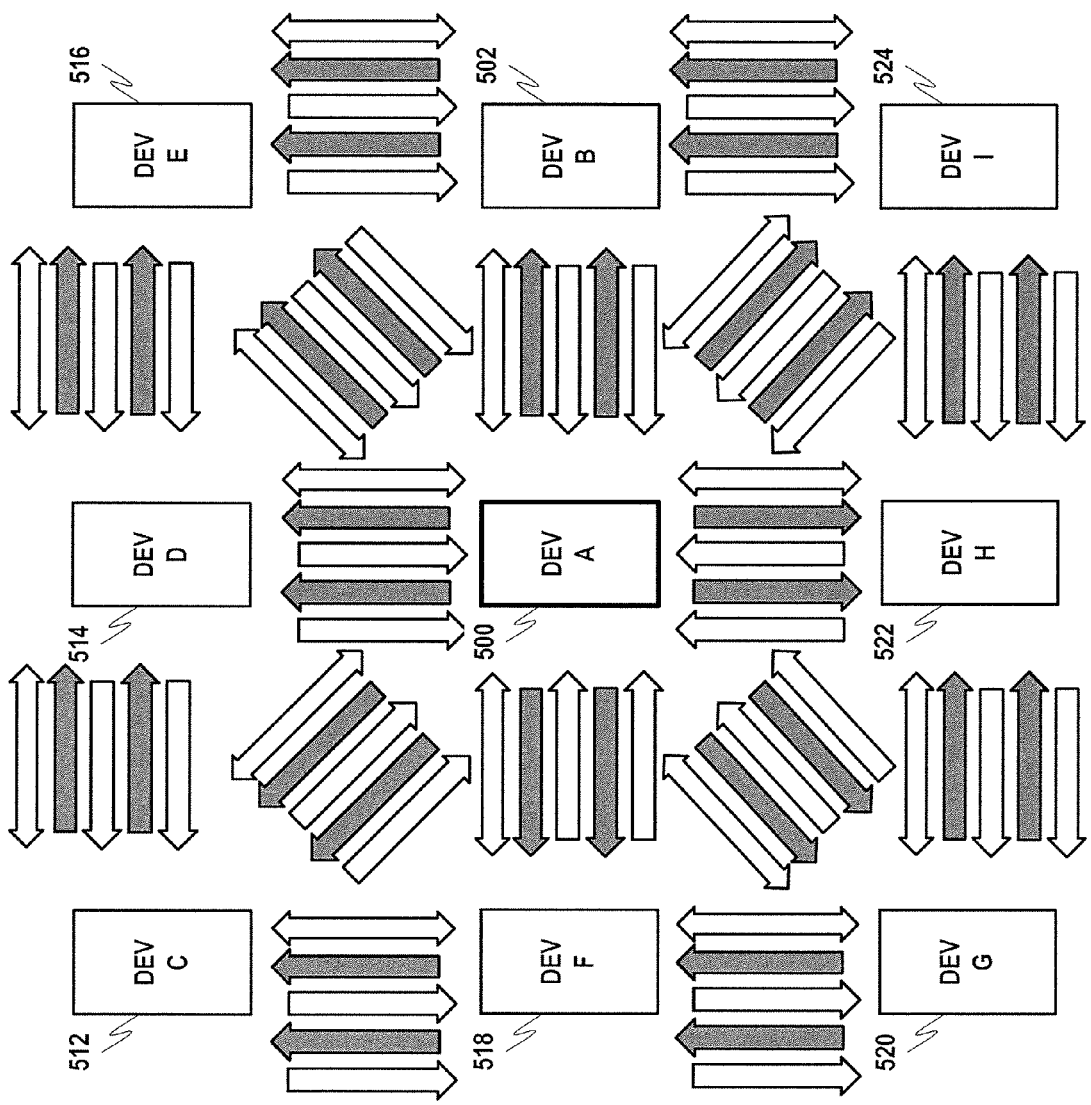
FIG. 5B discloses possible impacts of requiring a pairing process between every device in a device group in accordance with at least one embodiment of the present invention.

The exemplary processes disclosed in FIG. 5A are replicated to multiple devices in FIG. 5B. In FIG. 5B, devices A 500 and B 502 are now accompanied by devices C-I (shown at 512-524, respectively). Devices A-I are shown in a state wherein these devices are required to first pair with every device in which secured communication will take place. As is shown in this example, a large communication burden may be exerted on each of these devices as a pairing process must be performed between every device in a device group. This requirement may burden all of the wireless devices, especially of they are constrained resource devices.

In an example scenario based on the situation disclosed by FIG. 5B, devices A-I may all be components within a biometric tracking system (e.g., a device group). Device A 500 may be a battery-driven data collection device, and devices B-I (502 and 512-525, respectively) are various sensor devices worn on an individual's body in order to monitor pulse, temperature, pace, blood pressure, etc. of the individual. Since device A 500 may collect information from all of the other devices, under current strategies, a trusted or paired relationship must exist between device A 500 and all other devices. This may put a large strain on device A 500 as the pairing process required with each sensor device B-I may create a lot of wireless traffic, as well as additional power drain to support this messaging. This may shorten the operational life of device A 500.

The other devices B-I in this example may also be adversely affected by operation under current communication schemes. Presuming at least some of the device B-I are simple sensors, the pairing process may burden their basic control systems, and may further contribute to battery depletion due to the additional communication burden. Sensors small enough to fit in a watch, a shoe or to be worn on the skin will presumably be limited in size and complexity, and therefore, must operate under a system that recognizes, and compensates for, their limited ability.

VI. Encryption Key Propagation

Figure 6A:
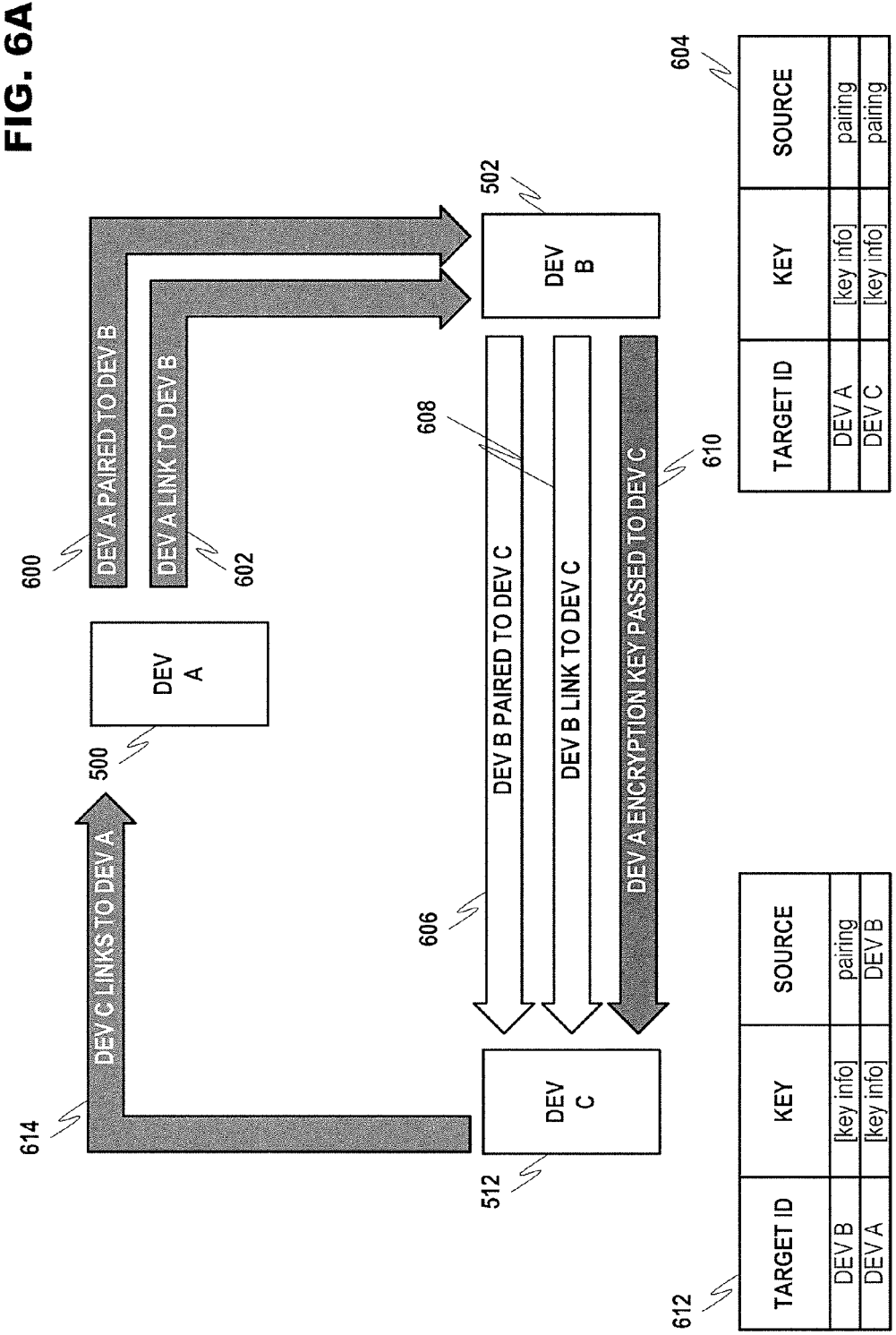
FIG. 6A discloses an exemplary encryption key propagation process in accordance with at least one embodiment of the present invention.

Now referring to FIG. 6A, a key propagation strategy in accordance with at least one embodiment of the present invention is now disclosed. In this example, an interaction between device A 500, device B 502 and device C 512 is shown. Initially, device A 500 may enter a trusted or paired relationship with device B 502 as shown at 600. As a part of this trusted relationship, device A 500 and device B 502 may further engage in a secure link at shown at 602, however, a further engagement in a secure link is not essential to the encryption key propagation process as disclosed in this example. The propagation of encryption keys may now be explained.

As a part of the initial pairing process between device A 500 and device B 502, information may be passed to device B 502 for use in computing encryption keys for establishing a secure connection with device A 500. Device B 502 may store these encryption keys along with various encryption keys for other devices to which device B 502 has a trusted relationship. An exemplary database that may be utilized for storing encryption key information is also shown in FIG. 6A at 604. Database 604 may include data related to the pairing interaction including, for example, the identification of the device to which an encryption key corresponds (TARGET ID), encryption key information (KEY) and the source of the encryption key information (SOURCE). Database 604 shows an entry for device A 500 including fields identifying device A 500, encryption key information pertaining to device A 500 and the source of the information being a previous pairing between device A 500 and device B 503 (e.g., "pairing").

Device B 502 may then encounter device C 512, and engage in a pairing process with this device at 606, which may also be reflected in database 604 stored on device B 502 as "TARGET ID: DEV C, KEY: [key info] and SOURCE: pairing." After device B 502 and device C 512 have been paired, the devices may further engage in a secured wireless connection at 608 over which information may be exchanged. Part of this information exchange may involve device B 502 passing one or more encryption keys for other devices in a device group, such as device A 500, to device C 512. This propagation of encryption key information is shown at 610.

Depending on the sophistication of device B 502, a determination may be made as to whether one or more encryption keys for other devices should be transferred to device C 512 before these encryption keys are conveyed. This determination may include determining which of the stored encryption keys should be forwarded to the receiving device, and may be made, for example, based on identification information provided by the receiving device to the providing device. This identification information may include specific device identification information, information that identifies the receiving device as being part of a device group, information that indicates a receiving device operating mode, indicator status information, etc. For instance, indicator status information may be as simple as a flag in device C 512 that indicates encryption keys should be conveyed, and may be a bit flag set in the receiving device. A simple bit flag system may be more suitable for resource constrained devices such as low power sensors. Otherwise, in at least one embodiment of the present invention, all stored encryption keys may always be transferred to all encountered paired devices. This sort of key basic distribution strategy may be utilized in scenarios where all encountered devices are very simple resource constrained devices, all wireless devices expected to be encountered are in the device group, etc.

In view of the above, if device B 502 passes encryption key information related to device A 500 to device C 512, this information may be stored by device C 512 in database 612. In the example of FIG. 6A, the stored information may identify the target device as device A 500, include the passed encryption key information, and may further identify the source of the encryption key information as device B 502. Now that device C 512 has been passed encryption keys for at least device A 500, a secure link may be established between device C 512 and device A 500 without being required to first engage in a pairing process. More specifically, device C 512 may establish a secure link using the keys passed from device B 502 without having to engage in the key creation and pairing processes previously described in FIG. 5A at 504 and 506.

In at least one scenario, device A 500 may request device identity information to verify against information embedded within the encryption key information supplied by a device requesting a secure link. This verification may occur due to the operational parameters of the particular wireless communication medium being utilized, a security enhancement enacted in device A 500, etc. In response, device C 512 may be forced to "impersonate" another device (e.g., device B 502) when engaging in a secure link with device A 500. In such a situation, device C 512 may supply the previously stored SOURCE information for DEV B 502 (e.g., from database 612) to DEV A 500 so that the identity information will match the encryption key information. A secure link, such as previously described at 508 in FIG. 5A, may then result such as shown at 614 in FIG. 6A. As a result of this secure link, information may be passed between the two devices, such as in the biometric telemetry scenario where data recorded by a sensor placed upon an individual is wirelessly transmitted to a collection device (e.g., device A 500).

More specifically, in accordance with at least one embodiment of the present invention, the security and identity contexts in Wibree™ may be separated from device identity using so-called private addresses "AAx" that may be temporarily utilized by devices. Private addresses have traditionally been used to protect the identity of a device from other devices that could intercept and use device address information for malicious purposes (such as impersonating the device). However in this exemplary implementation, the security context may be transmitted from one device to another without needing to involve advertising device(s).

Under current private address practices, an advertising device can only submit to the master device the next (e.g., future) private address that it is going to use. This feature was originally designed to make it possible for the master device to quickly re-discover the advertiser in a re-connect procedure, or for efficiency reasons to "white-list" the address in question (e.g., to record a future address as a recognized address) during a longer break in communication.

Next is discussed a meta-definition (an augmentation) for the construction of the random part of the private address, as well as for the random value used the advertising device seed for the keying. The advertiser (e.g. on booting) may select a random value ARR (16 bytes) and initializes a 4-byte address counter ARRC to 0. The random part of the address will always be taken from the first bytes of the image:

$$CARV = E_{ARR}(ARRC|\text{magicval})_{0...23}$$

i.e., the advertiser's address may now take the form $$AA = [CARV, E_{IRK}(CARV)]$$

where IRK is the relevant identity resolving key and CARV may constitute the 24 first bits of the image of the encryption with $E_{ARR}$. After the operation is done, the ARRC is incremented. Instead of the next private address to be used (or optionally as an additional PDU) the advertiser will send the random value and the current counter value (ARR and ARRC) to the peer. This may be completely acceptable from a security point of view since the peer in question anyway can deduce all current and future addresses of the advertising device in question. Additionally, the random key value (IRV) to be submitted in the connection phase may be determined by the 80 least significant bits of the very same encryption image CARV that was used for private address construction.

Figure 6B:
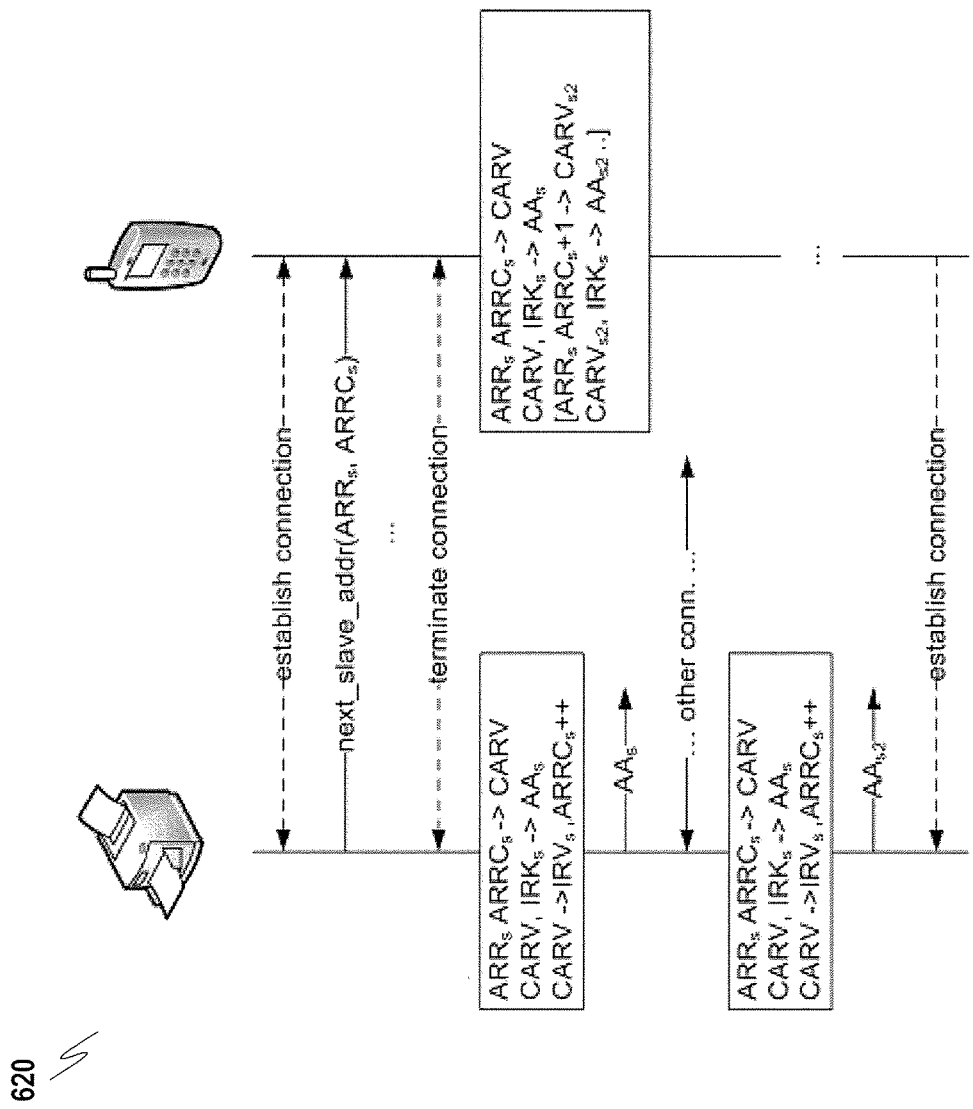
FIG. 6B discloses an exemplary device communication process in accordance with at least one embodiment of the present invention.

The operation above may be invoked every time a connection is lost and the advertiser needs to advertise its presence. The solution gives advantages and communication savings not only related to hand-offs, but also for the connecting party in re-connects. An exemplary operation representing this interaction is disclosed at 620 in FIG. 6B. The connecting party may know not only the next address, but also other future private addresses of the advertising device based on a previously advertised random part. As the connecting device may be more powerful, a search for future values (e.g., 30 future values) may be easily achieved, and the white-list of the connecting device can be augmented not only with the next private address, but a few future private address values. However, the counter value should not also be broadcast, as the value may be enough for an attacking device to track the location of a device.

Knowing its own future addresses, the connecting party may be able to pre-compute the session keys for the next connection. For some devices this may be valuable, as the connecting device may get the random vector of the advertiser a later phase during session establishment. The same approach may be applied by the initiating device for its future connection addresses. An advertiser-specific random value can be determined in the initiator (IRR), and the connection addresses may be resolved as $$CIRV = _{IRR}(IRRC|\text{magicval2})$$

On releasing the random value IRR (and related counter IRRC) to the advertising device, this device may fill its white-list appropriately also for future connects. This feature may alleviate synchronization problems if a connection establishment fails in a very early phase.

Figure 6C:
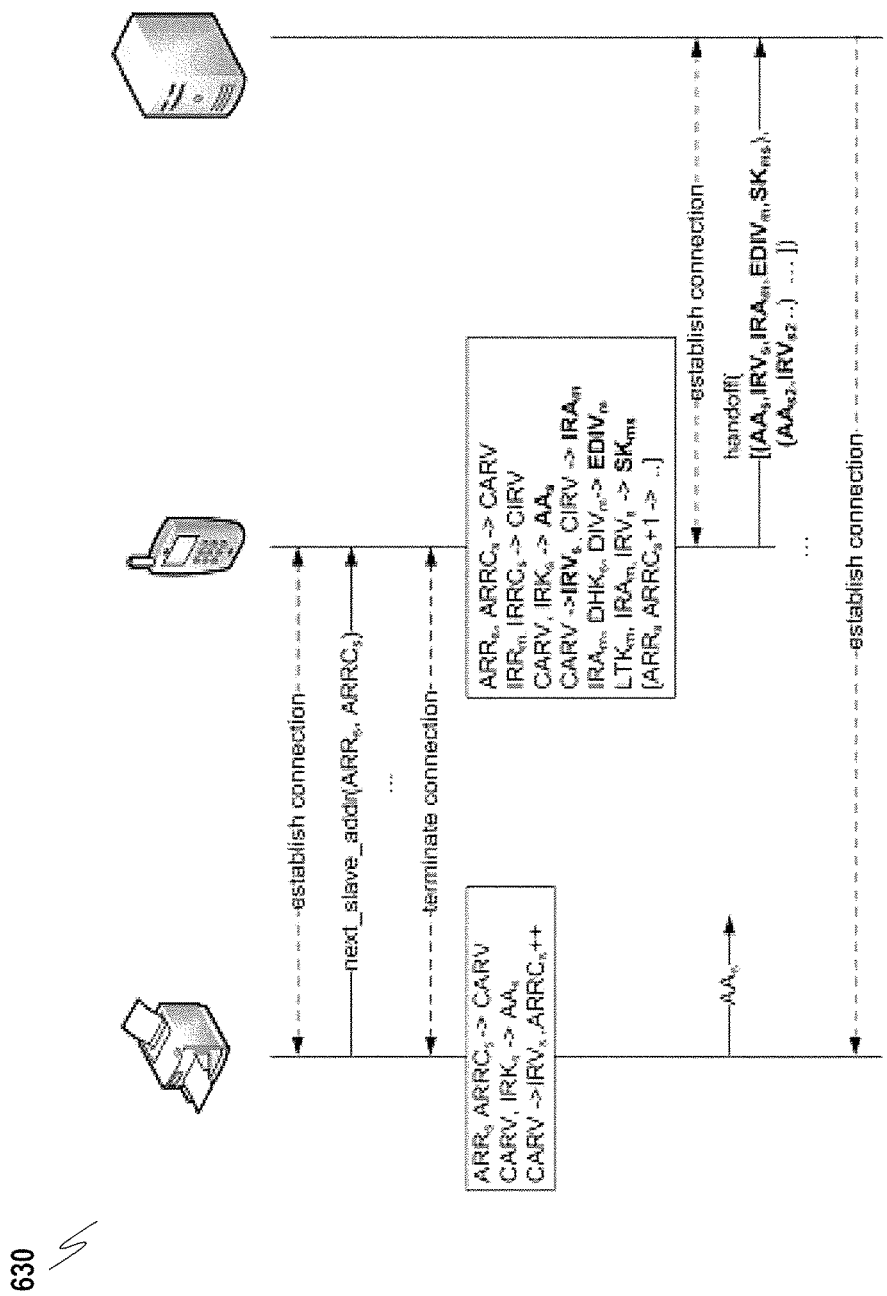
FIG. 6C discloses another exemplary device communication process in accordance with at least one embodiment of the present invention.

Now referring to process 630 in FIG. 6C, in a security hand-off procedure, one master may now submit to another master sufficient key material for a hand-off. This involves sending from the original master a set of tuples:

$$(AAI, IRV_i, SK_i, EDIVi, IRA_i)$$

wherein the addresses and session key are calculated conditionally to $CARV_i$ and $IRA_i$, the latter possibly a part of a CIRV image. Thus the "temporary master" may then select the tuple based on the address of the advertisement, connect with EDIV; and $IRA_i$, as well as check that the received $IRV_i$ matches before deploying a session with the given $SK_i$. This operation may not be conditional to the master submitting CIRV to the advertising device, but that might anyway be important for white-listing purposes in the device.

A master receiving these tuples may neither know the identity parameter of the advertiser nor the long-term secret between the original initiator-advertiser pair. Thus the new master can only operate within the count of its tuples, which can be used for benefit in use cases that involve lending/borrowing resources. However, as the probability of repeated reconnects to maintain the service cannot be a priori defined, in other cases it might be beneficial for the advertising device to release the identity (and a new diversified long-term key) on request to the new master within the first established encrypted session. This request must come from the master, since to the advertiser the new initiator is indistinguishable from the old one.

Currently in Wibree™, white-listing is defined as a set and/or list of values that are matched in an absolute manner. A better optimized white-listing algorithm may be to deploy a set of Bloom filters for each private address sequence that is to be matched. This approach given below is valid both for white-listing advertiser addresses for advertisements, and initiator addresses for connection attempts.

A Bloom filter is an aggregate of several values into one. The matching is done based on a subset match: if a compared address can be considered a subset of the filter, the filter returns TRUE. A Bloom filter=lies a potential for false positives that is proportional to the length of the filter and the aggregation factor. In the following, a Bloom filter targeted for Wibree™ purposes is presented. The filter (for one address) is 256 bits (16 bytes) long. The match for a 6-byte address is done by taking each individual byte of the address and comparing it against the relevant bit in the filter. If, for all 6 bytes, the corresponding bits in the filter are 1, a match is found. As an algorithm (1):

$$z \leftarrow 1 \text{ for } i \leftarrow 0 \text{ to } 5 \text{ do } \begin{cases} \text{if } bloom[addr_i] = 0 \\ \text{then } z \leftarrow 0 \end{cases} \quad (1)$$

$$\text{return } (z)$$

In order to achieve energy savings, the matching functionality may be done on the link layer (a basic white-listing requirement). Correspondingly, the construction of a Bloom filter on the host layer for, say 30 future values of a private addresses is simply the equivalent setting of the 256-bit Bloom filter array (2):

$$\text{for } i \leftarrow 0 \text{ to } 255 \text{ do } \{bloom[i] \leftarrow 0. \quad (2)$$

$$\text{for } j \leftarrow 0 \text{ to } 29 \text{ do } \begin{cases} \text{for } i \leftarrow 0 \text{ to } 5 \\ \text{do } \{bloom[addr[j]_i] \leftarrow 1 \end{cases}$$

For an m-bit Bloom filter with k checks (hash functions) per value and n entries per filter, the false-positive probability, for example, that the filter returns true even though the value that is compared against never was inserted into the filter is (3):

$$p = \left(1 - \left(1 - \frac{1}{m}\right)^{kn}\right)^k \quad (3)$$

With 30 6-byte values corresponding to an address is entered into a 256-bit Bloom filter, the false positive rate will be 0.0057, i.e. on average every 2000th wrong value triggers the white-list. This may result in the host logic being unnecessarily activated, but the error will not propagate further. The above exemplary approach for white-listing saves space (30 future value can be stored in the space of less than 3 absolute addresses), and may have a benefit in that synchronization requirements between initiators and advertisers are relaxed significantly.

FIG. 6D discloses a situation similar to FIG. 5B, but in this exemplary scenario an impact of at least one embodiment of the present invention on a plurality of interacting wireless devices is shown. In accordance with the disclosed exemplary embodiment, if devices A-I (500, 502 and 512-524, respectively) are members of the same device group, then the requirement for device A 500 to pair with each and every device B-I (502 and 512-524, respectively) may be removed through encryption key propagation. Device A 500 may only establish a trusted relationship through pairing with a few devices in the group due to the continuous propagation of encryption keys within the device group in accordance with at least one embodiment of the present invention. As is evident from FIG. 6D, the overall amount of messaging, at least for device A 500, may be greatly decreased, which in turn may reduce both the amount of wireless message traffic between the devices, and likewise, reduce the power burden on each device required to perform these communication functions. In resource-constrained devices such as previously described, this reduced burden may result in substantially longer battery life.

Figure 7:
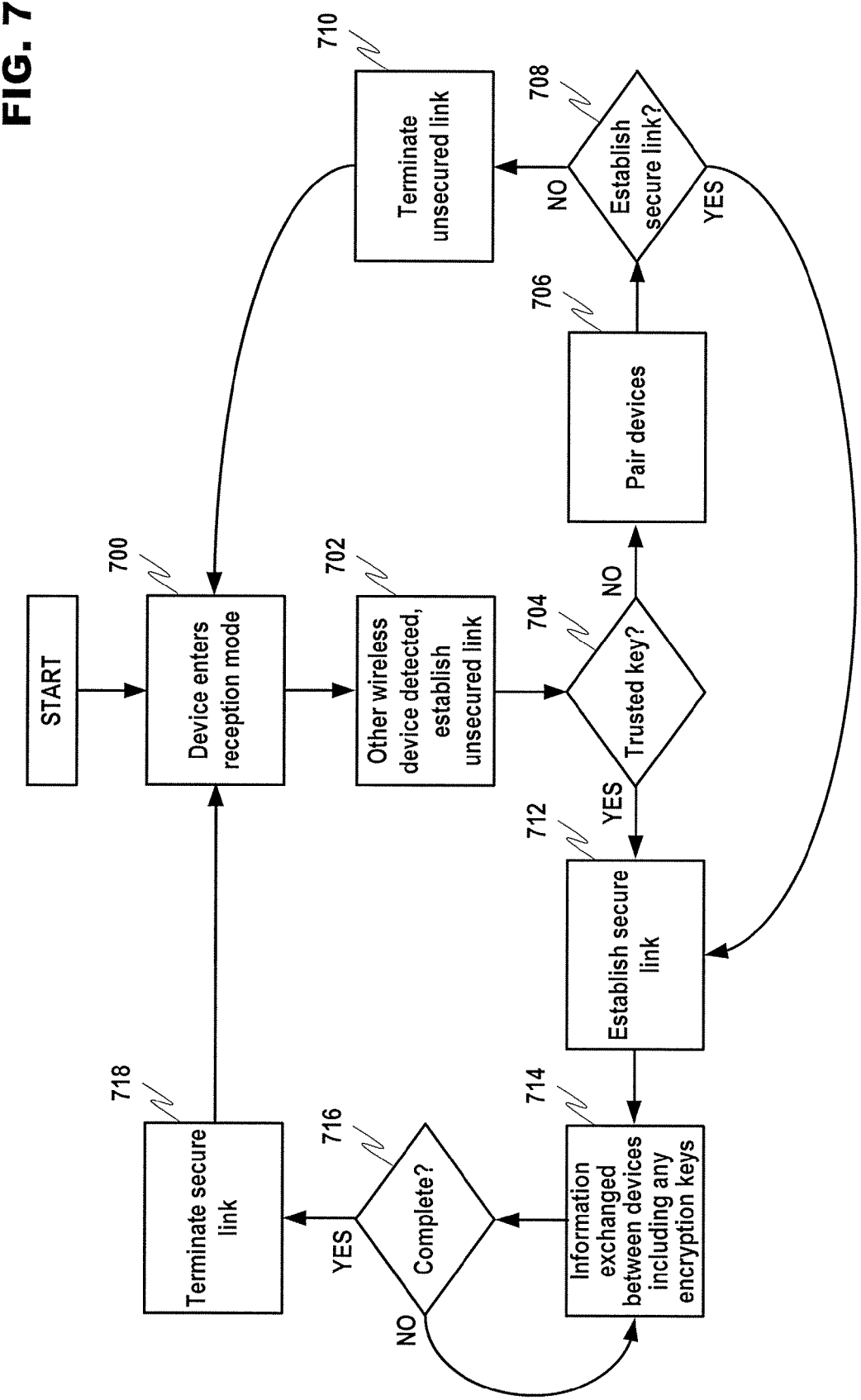
FIG. 7 discloses a flowchart for an exemplary process of receiving an encryption key in accordance with at least one embodiment of the present invention.

FIG. 7 now discloses a process for receiving encryption keys in accordance with at least one embodiment of the present invention. The process may begin at step 700, wherein a device enters a reception mode. This step may simply constitute that wireless communication resources supporting a particular wireless communication medium (e.g., Wibree™) have been enabled on a device. The activation of these resources may make the device available for linking with other devices operating in an advertising mode. In step 702, another device may be acting in an advertising mode and may request a link to the device. A determination may then be made in step 704 as to whether a trusted relationship already exists between the two devices. This determination may be made via wireless messages sent back and forth between the devices. If no trusted relationship is determined to exist at 704, then in step 706 a pairing process may begin such as previously explained at 504 in FIG. 5A. The pairing process may cause information to be sent back and forth between the devices. In the case of Wibree™, messages may be sent from the advertising device to the initiating device including information used for formulating encryption keys. Once this information is received, encryption keys may be formulated by the receiving device, and these encryption keys may be sent back to the advertiser for verification.

Once a trusted relationship has been established through pairing, the devices may also decide to establish a secure link at 708. If a secure link is not desired at step 708, then the unsecured link may terminate at step 710 and the process may restart at step 700. However, if establishing a secure link between devices is desired, then the process may move to step 712. It is important to note that this portion of this exemplary process that includes establishing secure link may also be the outcome of step 704 if it is determined that a trusted relationship already exists (e.g., that the device already retained encryption keys pertaining to the advertising device).

In step 712 a secure link may be created between devices. The secure link may allow information to be exchanged between the two devices at step 714 in a secure manner. In this example, the information delivered from the advertising device to the initiating (receiving) device may include one or more encryption keys from other devices in the device group. As previously set forth, this information delivery may include all of the encryption keys stored on the advertising device, or may include a portion of the encryption keys based on a determination. If the process of information exchange and encryption key delivery has completed per step 716, then the secure link may terminate at step 718 and the process may continue from step 700.

Figure 8:
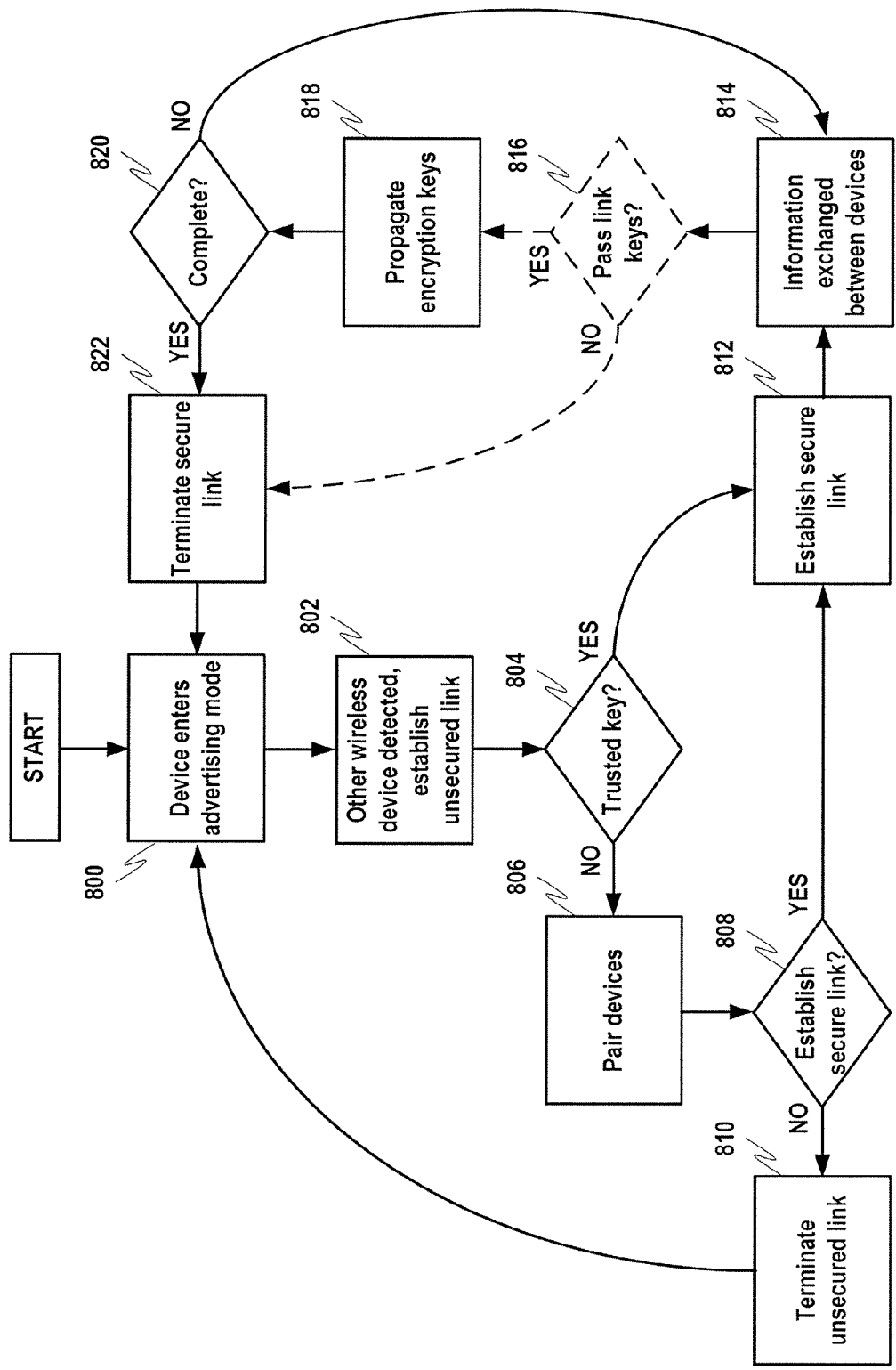
FIG. 8 discloses a flowchart for an exemplary process of propagating an encryption key in accordance with at least one embodiment of the present invention.

FIG. 7 describes an example process for receiving encryption keys. FIG. 8 now discloses an example process for propagating encryption keys. While two different exemplary processes are disclosed for encryption key reception and propagation, it is important to note that these processes may be performed by the same physical wireless device at different times. That is, a device acting in a reception mode may receive one or more encryption keys from another device, and then change operation to act in an advertising mode in order to propagate the received encryption keys to other devices. Further, while not pictured, the process of encryption key propagation may further include encryption key exchanges between devices (e.g., a two way process), wherein both trusted devices involved in a secure link exchange stored encryption keys.

Now referring to FIG. 8, a process for propagating encryption keys in accordance with at least one embodiment of the present invention is now disclosed. The process may start at step 800 wherein a wireless device enters an advertising mode. An advertising mode may consist of a mode where the device actively broadcasts wireless messages announcing a desire to form a wireless link with other encountered wireless devices. In step 802, another device may respond to this request to form a link, and an unsecured wireless link may be established between the devices. In step 804 a determination is made as to whether a trusted relationship already exists between these devices. If no trusted relationship exists (e.g., these devices have not already been paired) then a pairing process may occur starting at step 806. After the pairing process is complete, encryption keys formed by the receiving device allows the devices to form a secure link? If no secure link is desired at step 808, then the unsecured link may be terminated at step 810 and the process may restart at step 800. Alternatively, the process may continue at 812.

It is important to note that the establishment of a secure link in step 812 may also occur directly after step 804 if it is determined that a trusted relationship already exists between the participating devices. After a secure link is established (step 812), information may be exchanged between the devices at step 814. This information may include identification information related to the device, a group, a state, an indicator, etc. as previously explained in the disclosure. This information may be utilized in optional step 816 (shown as a dotted object in FIG. 8) in determining whether to transmit some or all of its stored encryption keys related to other devices to the device participating in the secure link. Step 816 is shown as an optional step because, depending on the level of sophistication of a propagating device and the strategy employed in a device group, a determination step such as shown in step 816 may not be utilized in some embodiments of the present invention. However, if step 816 is employed in the process, a determination may be made based on information received from the other device as to whether some or all of the encryption keys stored on the advertising device should be transferred. If it is determined that no encryption keys should be transferred, the process may proceed to step 822 wherein the secure link is terminated. If some or all of the encryption keys should be transferred, then these encryption keys may be propagated to the linked device at step 818. If step 816 is not incorporated in a particular embodiment of the exemplary process disclosed in FIG. 8, then once the link is established and communication occurs, then the keys may be propagated in step 818.

After step 814-818 are executed, a determination of whether the process has fully completed is made in step 820. If the process has not completed, then the process may continue to execute (e.g., communication may continue) under the secure link established at step 812 until all transactions are complete. If the process has now completed (e.g., concluding with some or all of the encryption keys related to other devices having been propagated), then in step 822 the secure link may be terminated and the entire process may resume at step 800. Again, while not shown, this exemplary process does not preclude the initiating device also propagating access keys to the advertising device in a sort of encryption key exchange propagation process. For the sake of explanation in this example, only a one way propagation process has been disclosed.

Accordingly, it will be apparent to persons skilled in the relevant art that various changes in form and detail can be made therein without departing from the spirit and scope of the invention. The breadth and scope of the present invention should not be limited by any of the above-described exemplary embodiments, but should be defined only in accordance with the following claims and their equivalents.

What is claimed:

1. A method, comprising:
   establishing a wireless link between an encountered device and a first device;
   determining whether a trusted relationship exists between the first device and the encountered device by checking whether an encryption key associated with the encountered device is stored within the first device;
   if the encountered device is determined to be a trusted device, establishing a secure link between the first device and the trusted device using the stored encryption key; and
   receiving, in the first device, encryption key information from the trusted device via said secure link for establishing a secure link between the first device and a target device, wherein the encryption key information comprises another encryption key and target device information identifying the target device associated with the other encryption key.

2. The method according to claim 1, further comprising providing information to the trusted device before receiving the encryption key information from the trusted device.

3. The method according to claim 1, wherein the received encryption key information further includes information identifying the trusted device as source for the information.

4. The method according to claim 1, further comprising establishing a secure link between the first device and the target device using the received encryption key information.

5. A method, comprising:
   establishing a wireless link between an encountered device and a second device;
   determining whether a trusted relationship exists between the second device and the encountered device by checking whether an encryption key associated with the encountered device is stored within the second device;
   if the encountered device is determined to be a trusted device, establishing a secure link between the second device and the trusted device using the stored encryption key;
   determining if encryption key information for establishing a secure link between the trusted device and a target device is to be transmitted to the trusted device via the secure link, wherein the encryption key information comprises another encryption key and target device information identifying the target device associated with the other encryption key, wherein said another encryption key is also for establishing a trusted relationship between the second device and the target device; and
   if it is determined that the encryption key information for establishing a secure link between the trusted device and the target device is to be transmitted, transmitting the encryption key information to the trusted device.

6. The method according to claim 5, wherein the encryption key information for establishing a secure link with the target device was received through a trusted relationship with the target device.

7. The method according to claim 5, wherein determining if encryption key information for establishing a secure link between the trusted device and the target device is to be transmitted to the trusted device is based on information received from the trusted device.

8. The method according to claim 5, wherein the encryption key information further includes information identifying the second device as source for the information.

9. A computer program product comprising a non-transitory computer usable medium having computer readable program code embodied in said medium, comprising:
   a computer-readable program code configured to establish a wireless link between an encountered device and a first device;
   a computer-readable program code configured to determine whether a trusted relationship exists between the first device and the encountered device by checking whether an encryption key associated with the encountered device is stored within the first device;
   a computer-readable program code configured to, if the encountered device is determined to be a trusted device, establish a secure link between the first device and the trusted device using the stored encryption key; and
   a computer-readable program code configured to receive, in the first device, encryption key information via said secure link from the trusted device for establishing a secure link between the first device and a target device, wherein the encryption key information comprises another encryption key and target device information identifying the target device associated with the other encryption key.

10. The computer program product according to claim 9, further comprising a computer-readable program code configured to provide information to the trusted device before receiving the encryption key information from the trusted device.

11. The computer program product according to claim 9, wherein the received encryption key information further includes information identifying the trusted device as source for the information.

12. The computer program product according to claim 9, further comprising a computer-readable program code configured to establish a secure link between the first device and the target device using the received encryption key information.

13. A computer program product comprising a non-transitory computer usable medium having computer readable program code embodied in said medium, comprising:
    a computer-readable program code configured to establish a wireless link between an encountered device and a second device;
    a computer-readable program code configured to determine whether a trusted relationship exists between the second device and the encountered device by checking whether an encryption key associated with the encountered device is stored within the second device;
    a computer-readable program code configured to, if the encountered device is determined to be a trusted device, establish a secure link between the second device and the trusted device using the stored encryption key;
    a computer-readable program code configured to determine if encryption key information for establishing a secure link between the trusted device and a target device is to be transmitted to the trusted device via the secure link, wherein the encryption key information comprises another encryption key and target device information identifying the target device associated with the other encryption key, wherein said another encryption key is also for establishing a trusted relationship between the second device and the target device; and
    a computer-readable program code configured to, if it is determined that the encryption key information for establishing a secure link between the trusted device and the target device is to be transmitted, transmitting the encryption key information to the trusted device.

14. The computer program product according to claim 13, wherein the encryption key information for establishing a secure link with the target device is received through a trusted relationship with the target device.

15. The computer program product according to claim 13, wherein the computer-readable program code configured to determine if encryption key information for establishing a secure link between the trusted device and the target device is to be transmitted to the trusted device is based on information received from the trusted device.

16. The computer program product according to claim 13, wherein the encryption key information further includes information identifying the second device as source for the information.

17. An apparatus, comprising:
    at least one processor; and
    at least one non-transitory memory including executable instructions, the at least one memory and the executable instructions being configured to, in cooperation with the at least one processor, cause the apparatus to:
    establish a wireless link between an encountered device and a first device;
    determine whether a trusted relationship exists between the first device and the encountered device by checking whether an encryption key associated with the encountered device is stored within the first device;
    if the encountered device is determined to be a trusted device, establish a secure link between the first device and the trusted device using the stored encryption key; and
    receive, in the first device, encryption key information from the trusted device via said secure link for establishing a secure link between the first device and a target device, wherein the encryption key information comprises another encryption key and target device information identifying the target device associated with the other encryption key.

18. The apparatus according to claim 17, wherein the at least one memory and the executable instructions are further configured to, in cooperation with the at least one processor cause the apparatus to provide information to the trusted device before receiving the encryption key information from the trusted device.

19. The apparatus according to claim 17, wherein the received encryption key information further includes information identifying the trusted device as source for the information.

20. The apparatus according to claim 17, wherein the at least one memory and the executable instructions are further configured to, in cooperation with the at least one processor cause the apparatus to establish a secure link between the first device and the target device using the received encryption key information.

21. An apparatus, comprising:
    at least one processor; and
    at least one non-transitory memory including executable instructions, the at least one memory and the executable instructions being configured to, in cooperation with the at least one processor, cause the apparatus to:
    establish a wireless link between an encountered device and a second device;
    determine whether a trusted relationship exists between the second device and the encountered device by checking whether an encryption key associated with the encountered device is stored within the second device;
    if the encountered device is determined to be a trusted device, establish a secure link between the second device and the trusted device using the stored encryption key;
    determine if encryption key information for establishing a secure link between the trusted device and a target device is to be transmitted to the trusted device via the secure link, wherein the encryption key information comprises another encryption key and target device information identifying the target device associated with the other encryption key, wherein said another encryption key is also for establishing a trusted relationship between the second device and the target device; and
    if it is determined that the encryption key information for establishing a secure link between the trusted device and the target device is to be transmitted, transmitting the encryption key information to the trusted device.

22. The apparatus according to claim 21, wherein the at least one memory and the executable instructions are further configured to, in cooperation with the at least one processor cause the apparatus to receive the encryption key information for establishing a secure link with the target device.

23. The apparatus according to claim 21, wherein the at least one memory and the executable instructions are further configured to, in cooperation with the at least one processor cause the apparatus to determine if encryption key information for establishing a secure link between the trusted device and the target device is to be transmitted to the trusted device based on information received from the trusted device.

24. The apparatus according to claim 21, wherein the encryption key information further includes information identifying the second device as source for the information.

* * * * *